Aug. 14, 1951  M. E. F. JONES  2,564,480
CAR CRIB
Filed Oct. 4, 1946  3 Sheets-Sheet 1
FIG_1_
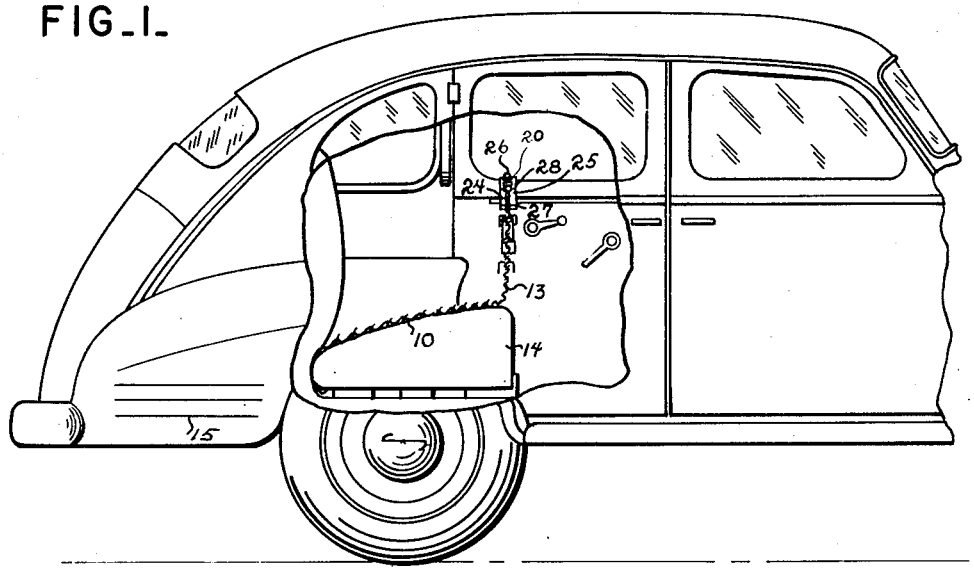
FIG_2_
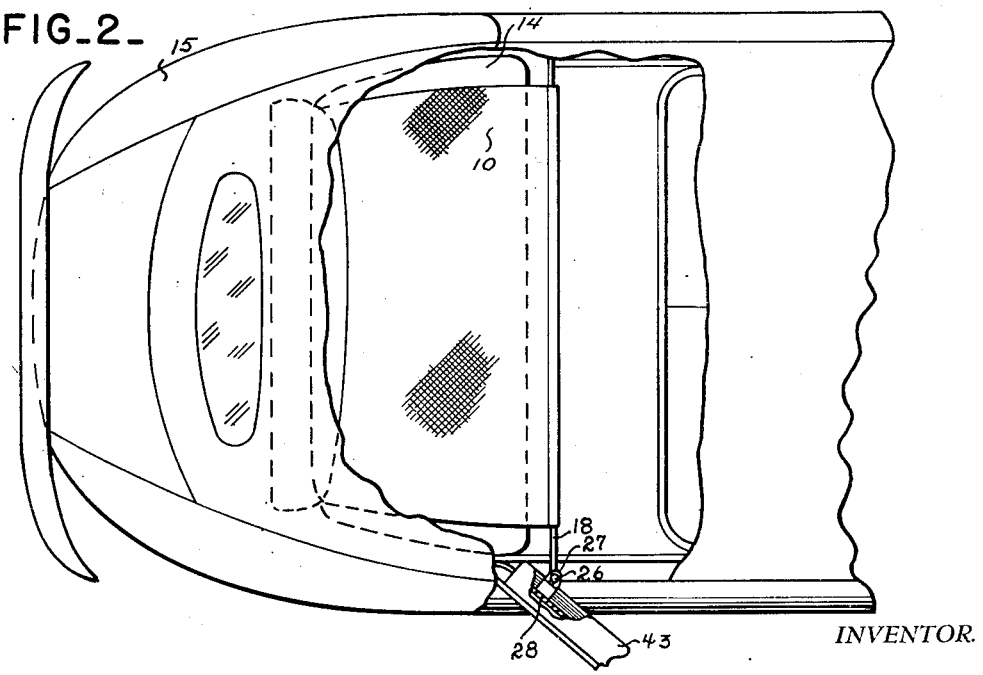
INVENTOR.
MARY E. FOOS JONES
BY *Victor J. Evans & Co.*
ATTORNEYS

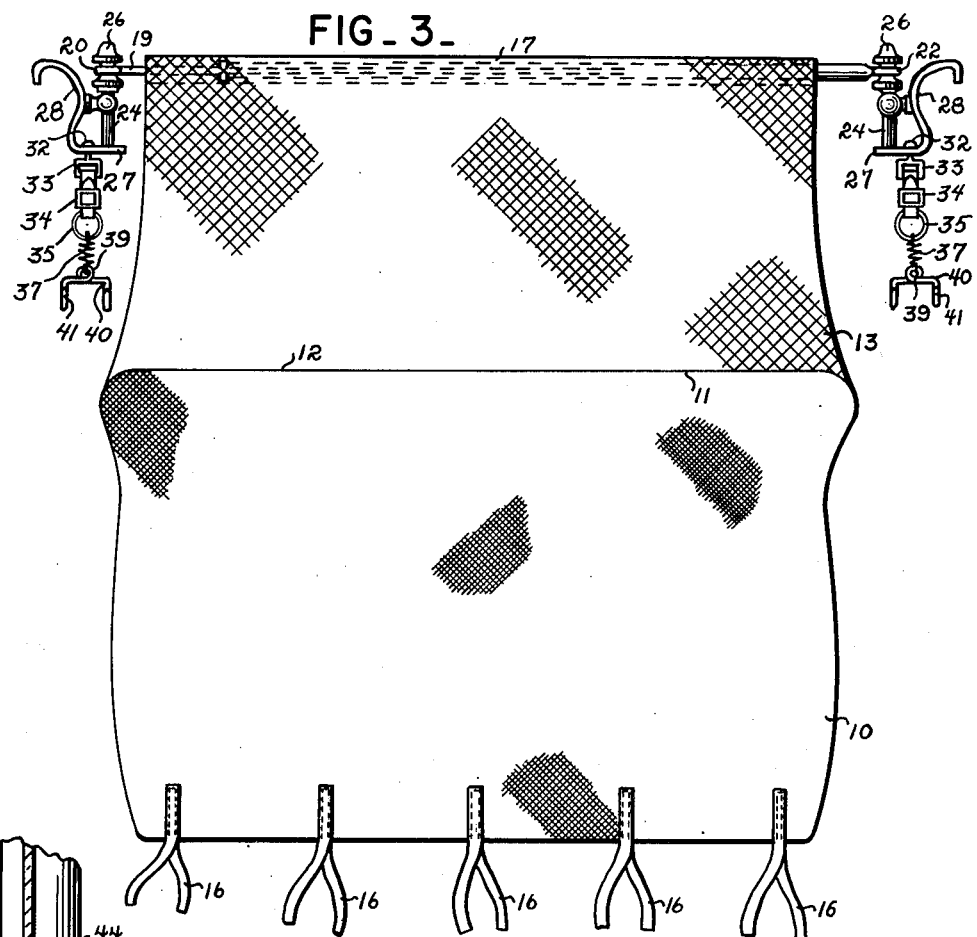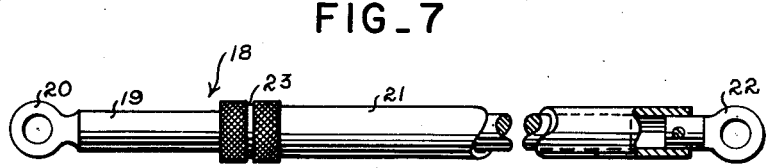

Aug. 14, 1951  M. E. F. JONES  2,564,480
CAR CRIB
Filed Oct. 4, 1946  3 Sheets-Sheet 3
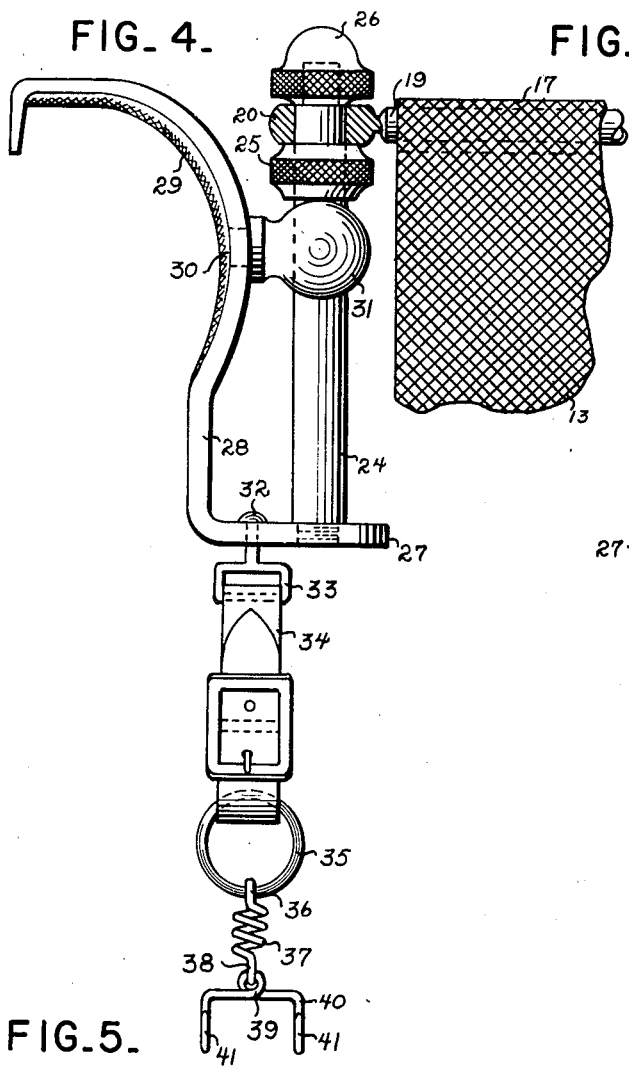
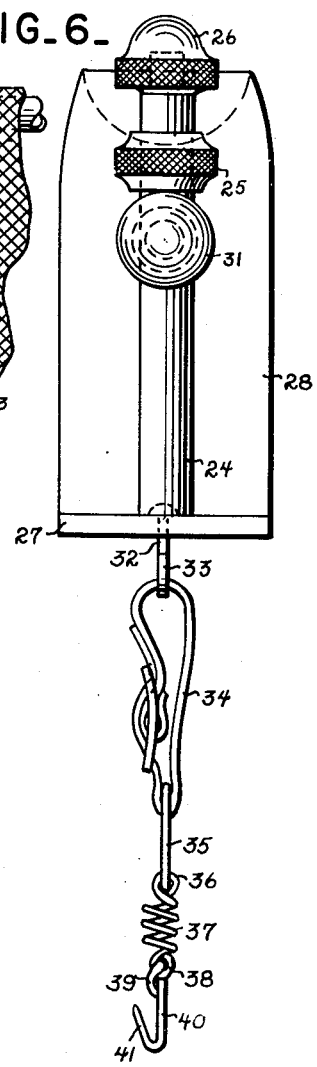
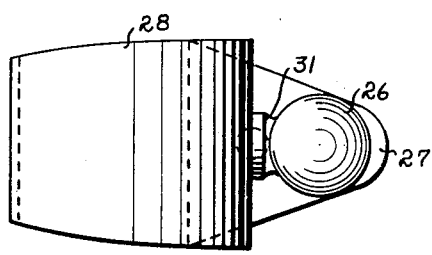
*INVENTOR.*
MARY E. FOOS JONES
BY *Victor J. Evans & Co.*
ATTORNEYS Patented Aug. 14, 1951

2,564,480

UNITED STATES PATENT OFFICE 2,564,480

CAR CRIB

Mary E. Foos Jones, Teaneck, N. J.

Application October 4, 1946, Serial No. 701,111

1 Claim. (Cl. 5—94)

This invention relates to a car crib which, used in conjunction with the rear seat of a motor vehicle, will afford protection and comfort to the occupant thereof.

An object of the invention is to provide a car crib that will be supported by means attached to the rear doors or rear windows of a motor vehicle.

Another object of the invention is to provide a car crib that will afford the occupant sufficient ventilation and comfort, is washable and can be easily installed or removed from the motor vehicle as described.

With the above and other objects and advantages in view, the invention consists of the novel details of construction, arrangement and combination of parts more fully hereinafter described, claimed and illustrated in the accompanying drawings in which:

Figure 1 is a side elevational fragmentary view of a motor vehicle partly broken away to show an embodiment of the invention installed therein;

Figure 2 is a fragmentary plan view of a motor vehicle partly broken away to show an embodiment of the invention installed therein;

Figure 3 is a plan view of the device;

Figure 4 is a side elevational view of one of the supporting clamp members;

Figure 5 is a plan view thereof;

Figure 6 is a front view thereof;

Figure 7 is an elevational view partly broken away and partly in section, of the telescoping rod support and Figure 8 is a detailed view partly in section of one of the clamp members as installed on the door of the motor vehicle.

Referring more in detail to the drawings, the reference numeral 10 designates the base seat cover which can be made of duck or similar material which is secured at one longitudinal marginal edge 11 to the longitudinal marginal edge 12 of the sheet of netting material 13.

The cover 10 is placed on the rear seat 14 of the motor vehicle 15, and tabs 16 secured to the opposite longitudinal marginal edge thereof can be secured to the springs of the seat 14, or a bar can be placed under the seat, to which the tabs can be secured.

The netting 13 may have various size openings therein to afford ventilation for the occupant, visibility of the occupant and security to the occupant, since this netting is provided with a hem 17 to receive the telescopic supporting rod 18. The rod 18 comprises the bar 19 having the eye 20 secured to the end thereof, and the tubular sleeve member 21 mounted on the bar 19 having an eye 22 secured to the outer end thereof. The inner end of the member 21 is provided with a knurled collar 23 which will stiffen and strengthen the inner end, and prevent spreading thereof when the rod 18 is in telescoped position.

The eyes 20 and 22 of the rod 18 are adapted to be placed on the vertical pins 24 and rest on the knurled collar or shoulder 25 on the pin, and a knurled head nut 26 threadably mounted on the upper end of the pins will retain the eyes in fixed relation to the pins.

The lower end of the pin 24 is threaded to mount the pin in the horizontal flange 27 of the hooked shaped bracket 28 which is provided with a felt lining 29 in the loop portion to prevent damage to the finish of the motor vehicle.

Riveted in the bracket 28 is the reduced portion 30 of the spherical shaped bracket 31, which is centrally apertured to receive the pin 24, and the upper surface of the bracket 31 engages the lower surface of the collar 25 to form a more rigid support for the rod 18.

Rotatably mounted in the flange 27, inwardly of the pin 24, is the headed stem 32 of the oblong eye 33, in which is mounted the adjustable strap 34, which supports the ring 35, which is receivable in the looped end 36 of the coil spring 37, the opposite looped end 38 of the spring being receivable in the eye 39 of the U-shaped snubbing anchor 40, which is provided with upwardly extending hooked shaped ends 41, which engage in the upholstery 42 of the motor vehicle door 43 to firmly anchor the bracket 28 on the beading 44 of the door 43. The formation of the bracket will not interfere with the raising and lowering of the glass within the door, and the formation of the rod 18 will permit the door to be opened as shown in Figure 2.

With the cover 10 on the rear seat and secured to the inner-surface thereof, as described, the netting 13 will be supported by the rod 18, and brackets 28, to prevent occupant of the crib from falling from the seat if sudden stops are made or if a collision should occur.

It is believed that from the foregoing description, the operation and construction of the invention will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A device of the character described, for use with a motor vehicle having rear doors and seat comprising a base cover of heavy material adapted to be placed on said rear seat, tabs on the rear longitudinal edge of said cover to secure said cover to said rear seat, a net material secured to said heavy material along the forward longitudinal edge thereof, a telescopic rod secured to the opposite longitudinal edge of said net material for securing said net material to said rear doors to form a crib for the occupancy of a reclining person, hooked shaped brackets secured to the outer ends of said rods, said brackets adapted to be fastened on the rear doors of said motor vehicle, and spring tensioned anchoring means carried by said brackets for retaining said brackets on said doors.

MARY E. FOOS JONES.

REFERENCES CITED

The following references are of record in the file of this patent:

UNITED STATES PATENTS

| Number | Name | Date |
|---|---|---|
| 1,277,781 | Trammell | Sept. 3, 1918 |
| 1,563,218 | Morrison | Nov. 24, 1925 |
| 1,860,520 | Zink | May 31, 1932 |
| 1,959,974 | Westgate | May 22, 1934 |
| 2,048,955 | Showalter | July 28, 1936 |
| 2,191,848 | Cramer et al. | Feb. 27, 1940 |
| 2,260,584 | Schuck | Oct. 28, 1941 |